(12) United States Patent
Araki

(10) Patent No.: US 6,625,432 B1
(45) Date of Patent: Sep. 23, 2003

(54) RECEIVER

(75) Inventor: Mikio Araki, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/381,360

(22) PCT Filed: May 25, 1998

(86) PCT No.: PCT/JP99/02280

§ 371 (c)(1),
(2), (4) Date: Sep. 20, 1999

(87) PCT Pub. No.: WO99/62191

PCT Pub. Date: Dec. 2, 1999

(51) Int. Cl.[7] .............................. H04B 1/10; H01Q 9/38
(52) U.S. Cl. .................... 455/222; 455/277.1; 455/280; 343/829; 343/846
(58) Field of Search .................... 455/222, 223, 455/226.4, 228, 230, 270, 269, 275, 277.1, 278.1, 280, 202, 206; 342/357.13, 357, 362; 343/727, 700, 725, 712, 715, 113, 830, 829, 846

(56) References Cited

U.S. PATENT DOCUMENTS

| | | | |
|---|---|---|---|
| 4,721,963 A | * 1/1988 | Nagy et al. | 343/712 |
| 4,819,001 A | * 4/1989 | Ohe | 345/712 |
| 4,963,966 A | 10/1990 | Harney et al. | |
| 4,968,991 A | * 11/1990 | Yamazaki | 343/715 |
| 5,030,963 A | * 7/1991 | Tadama | 455/300 |
| 5,272,485 A | * 12/1993 | Mason | 343/700 |
| 5,412,393 A | * 5/1995 | Wiggenhorn | 343/702 |
| 5,543,808 A | * 8/1996 | Feigenbaum et al. | 343/727 |
| 5,585,806 A | * 12/1996 | Ogino et al. | 343/700 MS |
| 5,654,717 A | * 8/1997 | Nichols et al. | 342/357.06 |
| 5,777,583 A | * 7/1998 | Canora et al. | 343/700 MS |
| 5,872,540 A | * 2/1999 | Casabona | 342/362 |
| 6,011,518 A | * 1/2000 | Yamagishi et al. | 343/713 |
| 6,078,283 A | * 6/2000 | Bednar | 342/357.13 |
| 6,195,540 B1 | * 2/2001 | Ogino et al. | 455/344 |

FOREIGN PATENT DOCUMENTS

| | | |
|---|---|---|
| EP | 0 211 710 A1 | 2/1987 |
| EP | 0 450 996 A1 | 10/1991 |
| FR | 2 600 217 A1 | 12/1987 |
| GB | 2 253 521 A | 9/1992 |
| JP | 59-161932 | 9/1984 |
| JP | 63121324 | 5/1988 |
| JP | 2-137081 | 11/1990 |
| JP | 6188774 | 7/1994 |
| JP | 6-62588 | 9/1994 |

* cited by examiner

*Primary Examiner*—Nay Maung
*Assistant Examiner*—John J Lee
(74) *Attorney, Agent, or Firm*—Sughrue Mion, PLLC

(57) ABSTRACT

The fixation of a coaxial cable between a GPS receiver and a receiver antenna mounted in a vehicle to an earthing conductor allows the elimination of influences due to noise and the improvement of reception even if the GPS antenna and the receiver antenna are mounted on the same mounting board due to reduction in the size of the device.

12 Claims, 3 Drawing Sheets

RECEIVER

FIELD OF THE INVENTION

The present invention relates to a receiver such as, for example, a GPS receiver comprising a GPS antenna which acts as a receiving antenna and a GPS receiver module which acts as a receiving module.

BACKGROUND TO THE INVENTION

This type of GPS receiver is mounted in an automobile, receives a GPS signal from a satellite and detects an automobile position. In order to reduce the size of the device, the GPS receiver module and the GPS antenna are for example positioned in proximity on a mounting board of the vehicle dashboard for example.

However as discussed above, when the size of the device is reduced by positioning the GPS receiver module and the GPS antenna in proximity on the mounting board of the vehicle dashboard, noise is easily transmitted from the GPS receiver module to the GPS antenna and reception is lowered.

The present invention is proposed to solve the above problem and has as its purpose the removal of noise with a simple structure and the improvement of reception.

DISCLOSURE OF THE INVENTION

The receiver of the present invention comprises an earthed mounting board which positions a receiver module and a receiver antenna, a coaxial cable which connects said receiver module and said receiver antenna and an earthing conductor which fixes said coaxial cable to said mounting board.

This type of receiver allows noise, which are high frequencies which result from condenser action due to the coaxial cable shield and the casing, being directed to the earthing through the mounting board which is earthed to the earthing conductor. Thus reception is improved.

The receiver of the present invention is characterized by the use of a earthing conductor as a conductor which runs through the coaxial cable. This type of receiver does not need a designated earthing conductor and thus allows the number of components to be reduced and the layout to be simplified.

The receiver of the present invention is characterized in that an earthing conductor is comprised of solder which mounts a coaxial cable shield layer on a mounting board. This type of receiver allows the mounting of the coaxial cable to be strengthened and at the same time allows accurate laying of the earthing connection.

The receiver of the present invention is characterized in that one end of the earthing conductor is fixed to the receiver module and the free end is press fitted to the connector of the mounting board of the coaxial cable. This type of receiver allows noise which is generated by the coaxial cable to be directed to the earthing through the earthing conductor and allows improved reception.

The earthing conductor of the receiver of the present invention is characterized in that one end is fixed to the mounting board and the free end press fits the coaxial cable to the connector of the mounting board. This type of receiver allows noise which is generated by the coaxial cable to be directed to the earthing through the earthing conductor and allows improved reception as well as accurately maintaining the connection by maintaining the pressure on the connecting end on the connector.

The earthing conductor of the receiver of the present invention is characterized in that the earthing conductor is a cut off piece. This type of receiver allows for the earthing connection of the coaxial cable totally without the need for another member by the cut off piece provided on the mounting board. This allows for a simple cost effective structure. This also allows the noise from the coaxial cable to be directed to the earthing through the conductor and improved reception.

DETAILED DESCRIPTION OF THE PREFERRED EMBODIMENTS

The preferred embodiments of the present invention are explained in detail below with reference to the accompanying figures.

Embodiment 1

Figure 1:
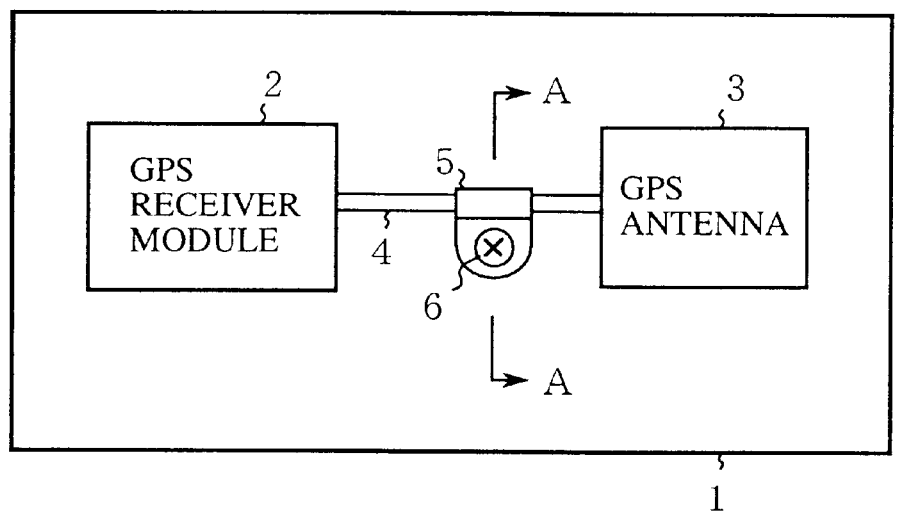
FIG. 1 is a plan figure of embodiment 1 of the present invention.
Figure 2:
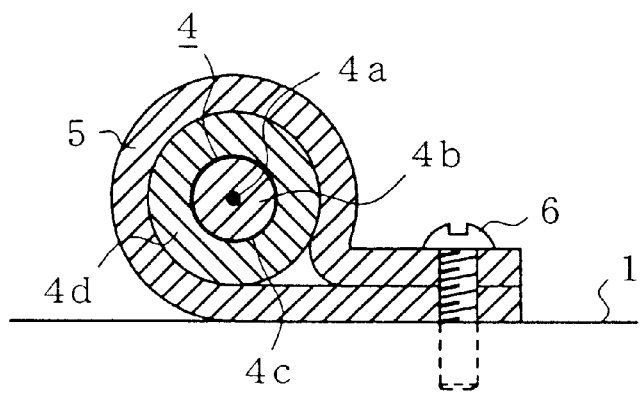
FIG. 2 is a lateral cross section along line A—A of FIG. 1.

FIG. 1 is a figure showing embodiment 1 of the present invention. In the figure, reference numeral 1 denotes an earthed mounting board, 2 is a GPS receiver module which is fixed and mounted on the mounting board 1, 3 is a GPS antenna (receiver antenna) which is fixed to the mounting board in proximity to the GPS receiver module, 4 is a coaxial cable which connects the GPS receiver module 2 and the GPS antenna 3, 5 is a conductor which is coiled part way along the coaxial cable 4 (earthing conductor), 6 is solder or a mounting screw of the conductor 5 on the mounting board 1. FIG. 2 is a lateral cross sectional enlargement along line A—A in FIG. 1.

The operation of the invention will be explained below.

Signals as well as high frequency noise is transmitted to the central conductor 4a of the coaxial cable. The noise is transmitted through the shield layer 4c. In this case, the coaxial cable 4 has a shield layer 4c provided on the outer peripheral surface of the insulation layer 4b which covers the central conductor 4a. An insulation maintenance layer 4d is provided on the outer peripheral face of the shield layer 4c. This insulation maintenance layer 4d is sandwiched by the conductor 5 and the shield layer 4c and acts as a condenser. The high frequency noise which is transmitted to the shield layer 4c is transmitted to the conductor 5, flows onto the earthing and is eliminated. As a result, it is possible to reduce noise transmitted to the GPS antenna 3 and to improve reception.

Figure 3:
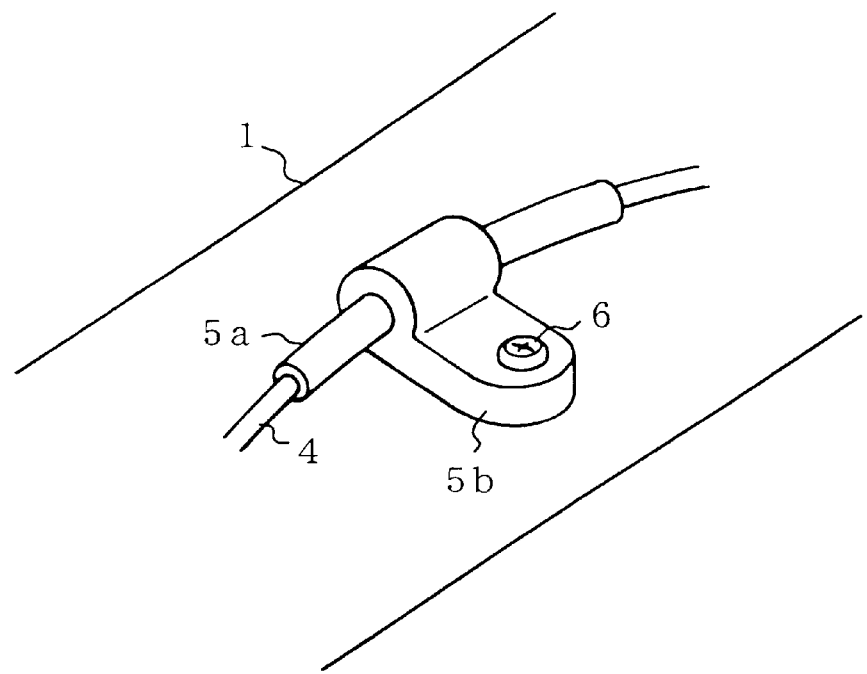
FIG. 3 is a perspective figure showing the tubular conductor used in embodiment 1 of the present invention.

A tubular conductor (the example shown) which runs through the coaxial cable 4, conductive foil which is coiled onto the coaxial cable 4, solder or the like may be used as the conductor 5. However as shown in FIG. 3, this may be in the form of providing a mounting piece 5b which projects laterally to the tubular conductor 5a which runs through the coaxial cable 4. It is also possible to fix a tubular conductor 5a running through the coaxial cable 4 to the mounting board 1 by the mounting piece 5b.

As shown above, according to embodiment 1, it is possible to direct noise generated along the coaxial cable 4 to the earthing through the conductor 5 by earthing and fixing the coaxial cable 4 along the GPS receiver module 2 and the GPS antenna 3 by the conductor 5 on the earthed mounting piece 5b. Thus it is possible to improve reception.

Embodiment 2

Figure 4:
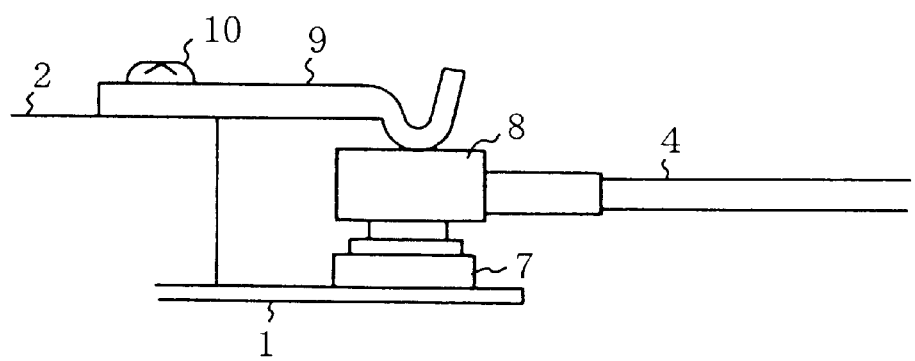
FIG. 4 is a side view of the component parts showing embodiment 2 of the present invention.

FIG. 4 shows a second embodiment of the present invention. In the figure, reference numeral 7 denotes a connector which is provided on the mounting board, 8 is a connecting terminal with respect to the connector 7 mounted on the end of the coaxial cable 4, 9 is a conductor (earthing conductor) one end of which is mounted by a screw 10 on the housing of the GPS receiver module 2 mounted on the mounting board 1. The free end of the conductor, which bends in a U shape and projects downwardly, presses on the upper surface of the connecting terminal 8. The connector 7 and the electrical circuit (not shown) in the interior of the GPS receiver module 2 are connected through a circuit (not shown) provided on the mounting board 1.

The operation of the invention will be explained below.

In a second embodiment of the invention, since the outer surface of the connecting terminal 8 is earthed through a housing of the conductor 9—GPS receiver module 2, as stated in embodiment 1 above, the insulation maintenance layer 4d is sandwiched between the coaxial cable 4 and the shield layer 4c and acts as a condenser. Thus the high frequency noise which is transmitted through the shield layer 4c is transmitted to the housing from the conductor 9, flows onto the earthing and is eliminated.

As shown above, according to embodiment 2 of the present invention, a connecting terminal 8 provided on the end of the coaxial cable 4 is connected to the connector 7. It is possible to eliminate noise in the coaxial cable by directing it to the earthing through the conductor 9 by maintaining the pressing connection of the connecting terminal 8 on the connecting terminal on the connector side with a conductor 9 one end of which is mounted with a screw 10 on the housing of the GPS receiver module 2. Thus reception can be improved and the connection of the connecting terminal 8 can be maintained on the connector 7.

Embodiment 3

Figure 5:
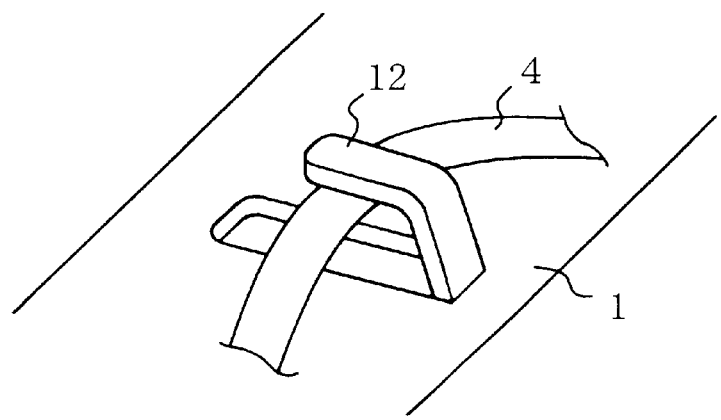
FIG. 5 is a perspective view of the components parts showing embodiment 3 of the present invention.

FIG. 5 shows embodiment 3 of the present invention. In the figure, 12 is a cut off piece provided on the mounting board 1. The cut off piece 12 acts as an earthing conductor running through the coaxial cable 4 between the mounting board 1.

As shown above, according to embodiment 3, it is possible to earth and connect the coaxial cable 4 totally without using a separate part. It is further possible to direct the noise which is transmitted to the coaxial cable 4 through the mounting board 1 by a simple and cost effective structure and to improve reception.

Embodiment 4

Figure 6:
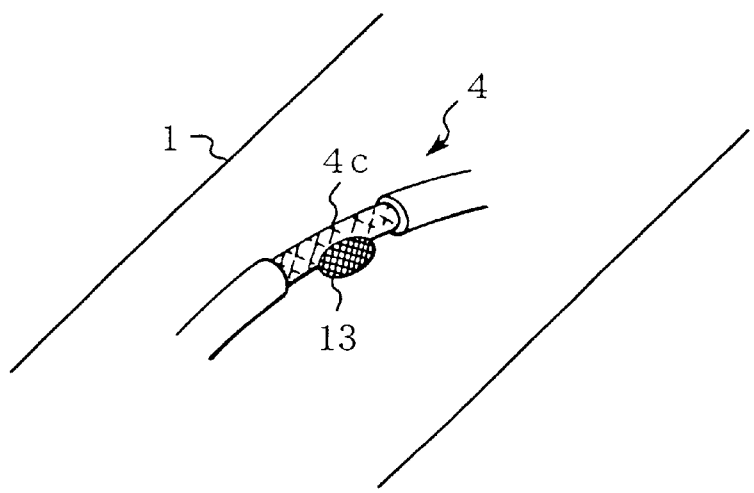
FIG. 6 is a perspective view of the components parts showing embodiment 4 of the present invention.

FIG. 6 shows embodiment 4 of the present invention. In the figure, 13 is solder which directly solders the shield layer 4c, which exposes and partially strips the insulating maintenance layer 4d of the outer surface of the coaxial cable 4, to the earthed mounting board 1.

As shown above, according to embodiment 4, it is possible to strengthen the mounting of the coaxial cable 4 by a soldered connection of the shield layer 4c of the coaxial cable 4 to the directly connected mounting board 1. At the same time, it is possible to accurately perform the earthing connection and to improve reception.

Each embodiment shows the GPS receiver module 2 and the GPS antenna 3 placed in proximity on the same mounting board 1. However even when the GPS receiver module 2 and the GPS antenna 3 are mounted independently on different mounting boards 1, the same effect is achieved in both embodiments due to earthing the coaxial cable 4 which connects both through a conductor 5.

INDUSTRIAL APPLICABILITY as shown above, the receiver of the present invention eliminates high frequency noise and improves reception, even when a gps receiver and an antenna are placed in proximity, by fixing a coaxial cable between the gps receiver and an antenna mounted in the vehicle.

What is claimed is:

1. A receiver which comprises:
   an earthed mounting board on which are disposed a receiver module and a receiver antenna,
   a coaxial cable which connects said receiver module and said receiver antenna,
   an earthing conductor which fixes said coaxial cable to said mounting board and directs high frequency noise which is transmitted from a shield layer of said coaxial cable to said earthing conductor onto said earthed mounting board, thereby reducing the high frequency noise transmitted to said antenna.

2. A receiver which comprises:
   an earthed mounting board on which are disposed a receiver module and a receiver antenna,
   a coaxial cable which connects said receiver module and said receiver antenna, and
   a tubular earthing conductor which surrounds an insulation maintenance layer of said coaxial cable and fixes said coaxial cable to said mounting board,
   wherein said tubular earthing conductor is adapted to allow said coaxial cable to pass through said tubular earthing conductor.

3. The receiver of claim 2, further comprising a mounting piece for fixing said tubular earthing conductor to said mounting board.

4. The receiver of claim 2, further comprising a mounting piece that is adapted to be mounted to said mounting board by soldering a portion of said mounting piece to said mounting board.

5. A receiver which comprises:
   an earthed mounting board on which are disposed a receiver module and a receiver antenna,
   a coaxial cable which connects said receiver module and said receiver antenna, and
   an earthing conductor which fixes said coaxial cable to said mounting board,
   wherein said earthing conductor is adapted to be mounted by soldering a shield layer of said coaxial cable to said mounting board.

6. A receiver which comprises:
   an earthed mounting board on which are disposed a receiver module and a receiver antenna,
   a coaxial cable which connects said receiver module and said receiver antenna, and an earthing conductor which fixes said coaxial cable to said mounting board, wherein one end of said earthing conductor is fixed to said receiver module and a free end of said earthing conductor is connected to a coaxial cable by press fitting said coaxial cable to said mounting board.

7. The receiver of claim 6, further comprising:

a connector disposed on said mounting board; and a connecting terminal fixed to said coaxial cable;

wherein said connecting terminal of said coaxial cable is press fitted between said free end of said earthing conductor and said connector of said mounting board, thereby reducing the high frequency noise transmitted to said antenna.

8. A receiver which comprises:

an earthed mounting board on which are disposed a receiver module and a receiver antenna, a coaxial cable which connects said receiver module and said receiver antenna, and an earthing conductor which fixes said coaxial cable to said mounting board, wherein one end of said earthing conductor is fixed to said mounting board and a free end of said earthing conductor is connected to a coaxial cable by press fitting said coaxial cable to said mounting board.

9. The receiver of claim 8, further comprising:

a connector disposed on said mounting board; and a connecting terminal fixed to said coaxial cable;

wherein said connecting terminal of said coaxial cable is press fitted between said free end of said earthing conductor and said connector of said mounting board, thereby reducing the high frequency noise transmitted to said antenna.

10. A receiver which comprises:

an earthed mounting board on which are disposed a receiver module and a receiver antenna, a coaxial cable which connects said receiver module and said receiver antenna, and an earthing conductor which fixes said coaxial cable to said mounting board, wherein said earthing conductor comprises a cut off or cantilevered piece provided on said mounting board.

11. The receiver of claim 10, wherein said cut off or cantilevered piece of said earthing conductor is integrally formed on said mounting board; and wherein said coaxial cable is press fitted between said cut off or cantilevered piece and said mounting board.

12. A receiver comprising:

an earthed mounting board;

a receiver module and a receiver antenna disposed on the earthed mounting board;

a coaxial cable which connects the receiver module and the receiver antenna, an earthing means for fixing the coaxial cable to the mounting board and directing high frequency noise, which is transmitted from a shield layer of the coaxial cable to the earthing conductor, to the earthed mounting board, thereby reducing the high frequency noise transmitted to the antenna.

* * * * *